Figure 1:
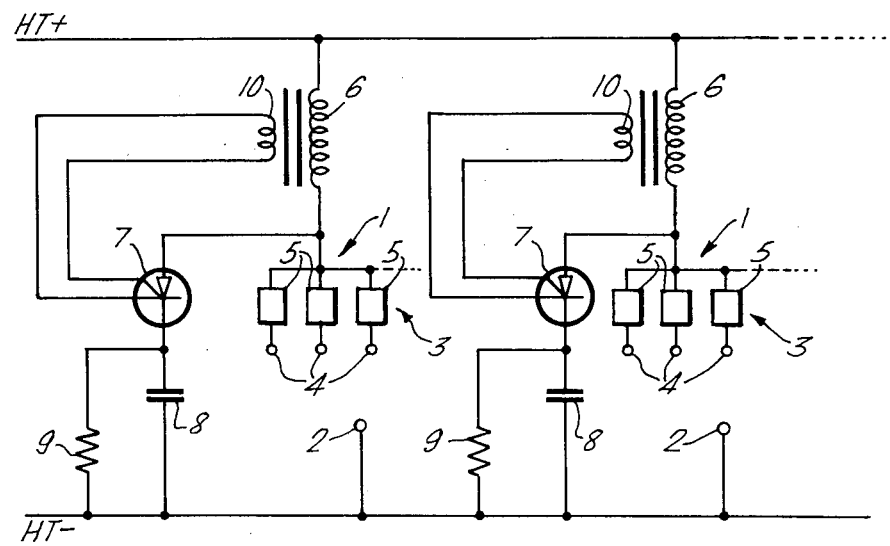

United States Patent [19]

Kaye et al.

[11] 4,330,762
[45] May 18, 1982

[54] CIRCUIT FOR STABILIZING AN ELECTRICAL DISCHARGE WITHIN A GLOW DISCHARGE GAS LASER

[75] Inventors: Alan S. Kaye, Wantage; Peter Millward, Didcot, both of England

[73] Assignee: United Kingdom Atomic Energy Authority, London, England

[21] Appl. No.: 127,000

[22] Filed: Mar. 3, 1980

[30] Foreign Application Priority Data

Mar. 21, 1979 [GB] United Kingdom ................ 7909986

[51] Int. Cl.³ .......................................... H01S 3/097
[52] U.S. Cl. .................................... 372/85; 372/38
[58] Field of Search .............. 331/94.5 PE, 94.5 S, 331/94.5 T; 315/119, 125, 126

[56] References Cited

U.S. PATENT DOCUMENTS 3,678,371 7/1972 Nuckolls ..................... 315/126 X
4,177,404 12/1979 Eguchi ........................ 315/125 X Primary Examiner—James W. Davie
Attorney, Agent, or Firm—Larson and Taylor

[57] ABSTRACT

A control device for a segmented anode gas discharge laser adapted to sense the onset of arcing in a region of the anode, switch off that portion of the anode and reenergize it when the arcing has ceased.

9 Claims, 3 Drawing Figures

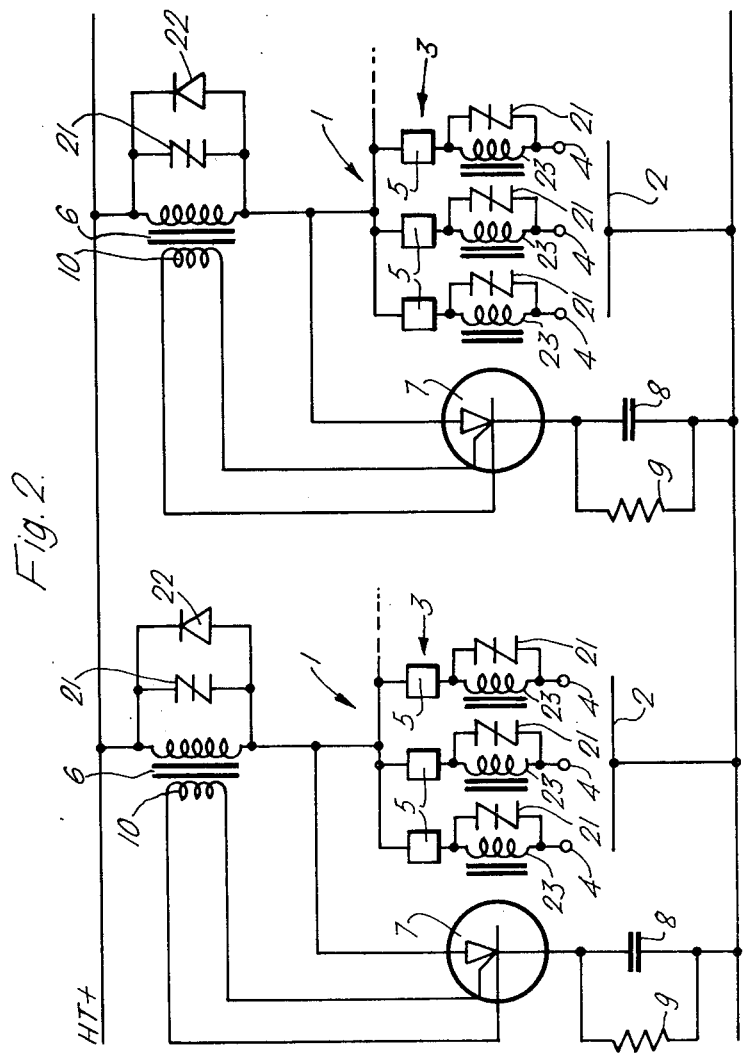

CIRCUIT FOR STABILIZING AN ELECTRICAL DISCHARGE WITHIN A GLOW DISCHARGE GAS LASER

The present invention relates to the stabilisation of the operation of gas discharge lasers.

A problem with CW gas lasers excited by electrical discharges arises from the tendency of the discharge to constrict into filamentary arcs which are not effective for exciting laser action. Such arcing occurs with increasing frequency as the input power density is increased. Many varying methods of stabilising discharges have been proposed (e.g. electron beam excitation, radio-frequency excitation, segmenting of the electrodes) which are effective in increasing the stable power density. Nonetheless, many lasers are still limited by the onset of arcing at higher power densities.

An alternative approach to the problem of arcing is to so reduce the effect of the arc on the output laser beam that its occurrence is of no subsequence to the application of the laser. This may be achieved by reducing the laser power loss during an arc and/or by reducing the duration of the arc to levels which do not affect the usefulness of the beam. The actual acceptable levels will depend on the application. Most industrial applications of high power lasers to welding, cutting or surface hardening involve processes which average over a time scale of a few (say, 5) ms or more, providing an upper limit to the duration of an arc for such applications. The total energy loss due to the arc should also be small (say 5%) in relation to the incident energy over this time scale. Thus an arc lasting 1 ms may have 20% loss during the arc to be acceptable to such applications.

The loss of power during an arc may be reduced by contaning the effects of the arc to a small section of the discharge. Thus, if the discharge is electrically divided into ten segments, then the loss of one segment due to an arc will reduce the output power by typically 20%, depending on the output coupling, gain, absorption of the unexcited gas, etc. Further segmentation will reduce the loss; this limitation is one of complexity and cost of the control circuits, and of the physical extent of the arc-affected zone. Such subdivision of the discharge is readily achieved on a segmented electrode transverse flow laser, for example.

The minimum duration of an arc and its effects are dependent on the cause of the arc. Arcs arising from cathode imperfections may require a long burning time to remove the imperfection. In lasers the operation of which is limited by volume instabilities in the discharge, the arc may be quenched very rapidly and the discharge restruck after the hot spots on the cathode and in the gas have dissipated due to conduction or convection. In a typical transverse flow laser, the gas convection time across the discharge is 1 ms; minimum arc durations of this order should therefore be possible if the arc can be switched off sufficiently rapidly that the cathode spot also dissipates in this time.

According to the present invention there is provided a sdtabilisation device for a glow discharge gas laser having a cathode electrode and a segmented anode electrode, comprising a bi-stable switching device connected in series with a capacitor across a plurality of parallel connected segments of the anode, and a main inductor connected in series with the segments of the anode, the main inductor having a secondary winding which is connected so as to control the operation of the bi-stable switching device.

The switching device may comprise a suitable thermionic valve such as a thyratron, a thyristor or a transistor.

If the segments of the anode have one or more inductive ballast circuits connected to them, then any tendency of the inductive components of the ballast circuit or circuits to reduce the sensitivity of the device to the onset of arcing can be reduced by shunting the inductive components of the ballast circuit or circuits with one or more capacitors or by using inductive components which have a high self-capacitance.

Preferably all the inductors which may be included in the device have voltage-limiting devices connected across them, and the main inductor has a diode reverse connected across it so as to limit the rise in reverse voltage which occurs when the stabilisation device operates and which may otherwise drive any excess current in the inductor through the discharge in the lasing medium when the bi-stable switching device switches off when the discharge is restruck.

Figure 3:
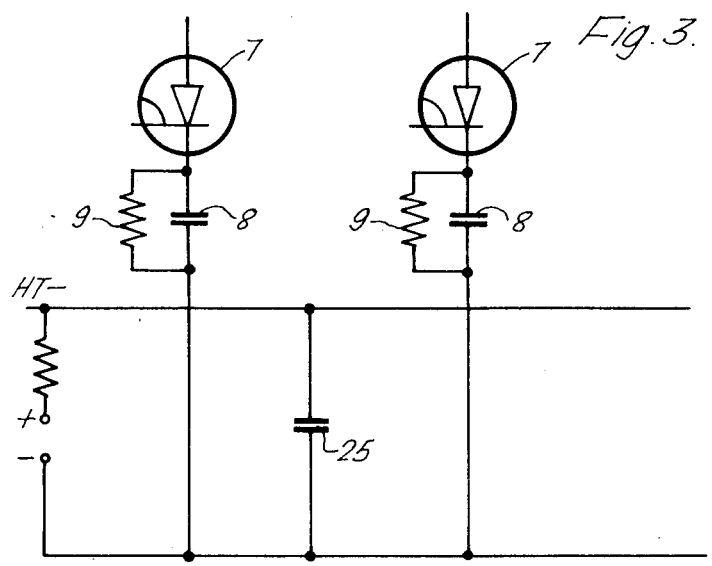

The invention will now be described, by way of example, with reference to the accompanying drawings in which, FIG. 1 is a circuit diagram of an embodiment of the invention, FIG. 2 is a circuit diagram of another embodiment of the invention, and FIG. 3 is a circuit diagram of a third embodiment of the invention.

Referring to FIG. 1, there is shown a device for stabilising the discharge in a gas discharge laser the electrodes of which are indicated schematically by the numerals 1 and 2. The anode electrode 1 is in the form of a series of segments 3 made up of individual electrodes 4. The cathode electrode 2 extends parallel to the anode electrode 1 but has only one continuous component, only a portion of which is shown. Each of the electrodes 4 is connected in parallel with the other members of its segment 3, and in parallel with those of the other segments 3. In series with each electrode 4 is a ballast circuit 5. An inductor 6 is connected in series with the electrodes 4 in each segment 3 and a thyristor 7 is connected in series with a capacitor 8 across each segment 3 of electrodes 4. Each capacitor 8 has a bleed resistor 9 connected across it. Each inductor 6 has a secondary winding 10 which is connected to the gate of the associated thyristor 7.

The operation of the circuit is as follows: occurrence of an arc in any segment 3 results in an increase in the voltage drop across the corresponding inductor 6. This induces a voltage in the secondary winding 10 on the inductor 6, which is connected to the gate of the associated thyristor 7. This voltage switches on the thyristor 7 with a sensitivity which may be determined by the number of turns on the secondary winding 10 on the inductor 6. The thyristor 7 is in turn connected across the discharge in series with the capacitor 8. On the switching of the thyristor 7, the voltage across the discharge falls rapidly to a low value, quenching both the arc and any remaining glow discharge. The voltage across the discharge appears across the inductor 6, while the current charges the capacitor 8. The values of the inductor 6 and the capacitor 8 are so chosen that the current increases only slightly in the time required to charge the capacitor 8 to the original discharge voltage. Thus the capacitor 8 charges effectively at constant current and at a rate inversely proportional to the value of the capacitor 8 until some threshold voltage is reached, whereupon the discharge restrikes. At this time, or shortly after, the voltage on the capacitor 8 reaches or exceeds the discharge voltage and the thyristor 7 switches off. The capacitor 8 is subsequently discharged through the bleed resistor 9, resetting the system for the next arc. The value of the bleed resistor 9 is chosen to keep the bleed current below the hold-on current of the thyristor 7 to avoid the possibility of the thyristor 7 not switching off. This limits the repetition rate. Higher repetition rates may be achieved if desired by using a critically damped inductive bleed or relying on the reversal in the voltage across the thyristor 7 when the discharge strikes. However, both of these methods have stable, steady state configurations with the thyristor 7 permanently switched on. It is noted that the current drawn from the power supply is nearly constant. Thus, interference with other segments 3 of the anode 1 or with the mains supply is minimal.

FIG. 2 shows another circuit in which all the inductors 6 are protected by voltage clipping devices, e.g. varistors 21, and a diode 22 is reverse connected across each inductor 6 to limit the rise in reverse voltage which may otherwise drive the excess currents in the inductors 6 through the discharge when the thyristors 7 switch off on restriking of the discharge.

In the FIG. 2 arrangements, the ballast circuits 5 include an inductive element 23, which may be segmented as illustrated or a single lumped inductor. This reduces the ability of the secondary winding on each inductor 6 to detect the onset of an arc sufficiently rapidly. This problem may be overcome by shunting each inductor 23 with a small capacitor or using an inductor 23 with high self-capacitance. On diverting the discharge current through a thyristor 7, the corresponding inductor 23 generates sufficient voltage to maintain the current through the varistor 7: this voltage is of such polarity as to maintain the discharge and may reduce the effectiveness of the thyristor circuit. This effect is cancelled by the reverse connecting diode 27 across each inductor 6. The small decrease in current in the inductor 6 produced by this reverse voltage is, however, desirable in enforcing the discharge to restrike at a reduced current initially. A preferable approach is therefore to cancel this voltage by biasing the negative side of each capacitor 8 further negative with respect to the cathode 2 by use of a small DC charging power supply and an additional capacitor 25 as shown in FIG. 3.

In the anode is segmented more finely than the arc control circuit, as is the case with many segmented electrode devices, a few of the segments may be driven directly from the HT rail, bypassing the arc control. This facilitates restriking of the discharge, whilst the total current drawn by these segments is limited by the ballast to values insufficient to maintain an arc.

This system of control has been tested on a 5 kW segmented anode, glow discharge $CO_2$ laser. The anode was divided into six segments for arc control purposes, each with a thyristor switch as above. Reliable operation with effective quenching of arcs was achieved with switch-on times of about 50 $\mu$s from the onset of the arc, and durations of 1 ms. The loss in power from the output beam with one segment off was 1 kW, giving a total energy loss per arc of 1 joule. With this arc control fitted, reliable operation was extended from 5 kW to 6 kW, and operation at the rated 5 kW was improved by the elimination of significant arcs previously occurring at the rate of several per hour.

We claim:
1. A circuit for stabilising an electrical discharge within a glow discharge gas laser having a cathode electrode and a segmented anode electrode, each segment of the segmented anode electrode consisting of groups of individual anode electrodes connected in parallel wherein there is provided a bi-stable switching device connected in series with a capacitor across each segment of the anode electrode, and a main inductor connected in series with each segment of the anode the main inductor having a secondary winding which is connected so as to operate the bi-stable switching device to cause the segment of the anode electrode to be shunted by the capacitor when the current flowing through the main inductor is above a value corresponding to the existence of an arc between any of the individual anode electrodes and the cathode electrode.

2. A circuit according to claim 1 wherein there is included means for providing a reactive ballast in series with each individual anode electrode.

3. A circuit according to claim 2 wherein the means for providing a reactive ballast in series with each individual anode electrode comprises a single inductor.

4. A circuit according to claim 2 wherein the reactive ballast has both inductive and capacitive components and the inductive component is arranged to be shunted by the capacitive component.

5. A circuit according to claim 4 wherein the circuit element or elements providing the inductive component has sufficient self-capacitance to provide the capacitive component.

6. A circuit according to claim 4 wherein each inductor has a voltage-limiting device connected thereto.

7. A circuit according to claim 1 wherein the main inductor has a unidirectional element so connected across it as to limit the rise in reverse voltage which can occur when the bi-stable switching device is switched from a conducting to a non-conducting state.

8. A circuit according to claim 1 wherein the bi-stable switching device comprises a thermionic value.

9. A circuit according to claim 1 wherein the bi-stable switching device comprises a semi-conductor device.

* * * * *